US012110221B2

(12) United States Patent
Gatti et al.

(10) Patent No.: US 12,110,221 B2
(45) Date of Patent: Oct. 8, 2024

(54) POURING DEVICE

(71) Applicant: LESAFFRE ET COMPAGNIE, Paris (FR)

(72) Inventors: Adrien Gatti, Lille (FR); Matthieu Guyot, Mons en Baroeuil (FR); Christian Dupire, Marquette Lez Lille (FR); Hervé Szymanek, Lambersart (FR); Yves Gosselin, Allouagne (FR)

(73) Assignee: LESAFFRE ET COMPAGNIE, Paris (FR)

( * ) Notice: Subject to any disclaimer, the term of this patent is extended or adjusted under 35 U.S.C. 154(b) by 197 days.

(21) Appl. No.: 17/786,153

(22) PCT Filed: Dec. 17, 2020

(86) PCT No.: PCT/FR2020/052507
§ 371 (c)(1),
(2) Date: Jun. 16, 2022

(87) PCT Pub. No.: WO2021/123645
PCT Pub. Date: Jun. 24, 2021

(65) Prior Publication Data

US 2023/0312320 A1 Oct. 5, 2023

(30) Foreign Application Priority Data

Dec. 19, 2019 (FR) ....................................... 1915023

(51) Int. Cl.
*B67B 7/00* (2006.01)
*B65D 81/20* (2006.01)

(52) U.S. Cl.
CPC .............. *B67B 7/26* (2013.01); *B65D 81/203* (2013.01)

(58) Field of Classification Search
CPC .................................. B27B 7/26; B65D 1/203
(Continued)

(56) References Cited

U.S. PATENT DOCUMENTS 4,776,488 A * 10/1988 Gurzan .............. B65D 75/5872 222/107
4,883,198 A * 11/1989 Manska ............. B65D 51/1677 222/1
(Continued)

FOREIGN PATENT DOCUMENTS

CN 1158591 A 9/1997
CN 1481322 A 3/2004
(Continued)

OTHER PUBLICATIONS

International Search Report for PCT/FR2020/052507 dated Apr. 14, 2021, 5 pages.
(Continued)

*Primary Examiner* — Paul R Durand
*Assistant Examiner* — Michael J. Melaragno
(74) *Attorney, Agent, or Firm* — NIXON & VANDERHYE

(57) ABSTRACT

Disclosed is a pouring device suitable for piercing and emptying a granular material contained in a vacuum-sealed package, including: a tubular body, having a duct for the flow of the material, extending from an inlet opening positioned at a first end of the tubular body to an outlet opening for the granular material, positioned at a second end of the tubular body; and a hollow piercing tool having a distal end ending in a pointed tip, and a widened base at the proximal end thereof, rigidly connected to the body. The device further includes a shoulder serving as a stop coming into contact with the wall of the package to stop the pouring device when the wall is pierced by the piercing tool, and possibly a bowl bringing the granular material having escaped the hollow portion of the piercing tool into the inside of the hollow portion by gravity.

12 Claims, 9 Drawing Sheets

(58) Field of Classification Search
USPC .............................................................. 222/81
See application file for complete search history.

(56) References Cited

U.S. PATENT DOCUMENTS

| | | | | | |
|---|---|---|---|---|---|
| 4,993,569 | A * | 2/1991 | Osip | B65D 51/224 | 215/250 |
| 5,325,995 | A * | 7/1994 | Harrison | B67B 7/26 | 222/81 |
| 5,405,053 | A * | 4/1995 | Zublin | B65B 69/0083 | 141/330 |
| 5,573,047 | A * | 11/1996 | Akin | B67D 3/0029 | 141/330 |
| 5,855,223 | A | 1/1999 | Halonen | | |
| 5,855,298 | A * | 1/1999 | Teetsel, III | B67B 7/26 | 222/88 |
| 6,089,406 | A * | 7/2000 | Feldner | B67D 7/80 | 222/105 |
| 6,095,433 | A * | 8/2000 | Langdon | A01G 27/006 | 222/553 |
| 6,109,315 | A * | 8/2000 | Stern | B65D 77/06 | 141/330 |
| 6,223,940 | B1 * | 5/2001 | Quinn | B67B 7/26 | 222/89 |
| 7,708,164 | B2 * | 5/2010 | Pritchard | B65D 77/067 | 222/88 |
| 7,937,836 | B2 * | 5/2011 | Gabriel | B29C 45/1676 | 222/81 |
| 8,353,428 | B2 * | 1/2013 | Pritchard | G01F 11/08 | 222/105 |
| 8,627,975 | B1 * | 1/2014 | Whitbeck | B65D 35/32 | 220/254.1 |
| 2004/0104246 | A1 | 6/2004 | Kawaguchi et al. | | |
| 2004/0238563 | A1 * | 12/2004 | Lin | B67B 7/44 | 222/192 |
| 2005/0077318 | A1 * | 4/2005 | Macler | B67D 3/0029 | 222/88 |
| 2005/0121464 | A1 * | 6/2005 | Miller | B65D 11/1873 | 222/81 |
| 2006/0249533 | A1 * | 11/2006 | Verespej | B65D 47/0814 | 222/153.01 |
| 2007/0205216 | A1 * | 9/2007 | Smith | B65D 77/067 | 222/81 |
| 2008/0257910 | A1 * | 10/2008 | Chang | B67B 7/28 | 222/105 |
| 2009/0206106 | A1 * | 8/2009 | Perez Ordonez | B67D 3/00 | 222/129 |
| 2009/0218370 | A1 * | 9/2009 | Michels | B67D 1/0004 | 222/85 |
| 2011/0017774 | A1 * | 1/2011 | Pritchard | G01F 11/08 | 222/207 |
| 2011/0031273 | A1 * | 2/2011 | Macler | B65D 25/48 | 222/1 |
| 2014/0048557 | A1 * | 2/2014 | Barron | B65D 75/5877 | 222/81 |
| 2014/0103065 | A1 * | 4/2014 | Lambrecht | B67D 1/0042 | 163/5 |
| 2014/0117041 | A1 | 5/2014 | Springhorn | | |
| 2023/0028996 | A1 * | 1/2023 | Gatti | B08B 9/0321 | |
| 2023/0312320 | A1 * | 10/2023 | Gatti | B65D 81/203 | 222/81 |

FOREIGN PATENT DOCUMENTS

| | | |
|---|---|---|
| CN | 103786957 A | 5/2014 |
| EP | 0 421 538 | 4/1991 |
| EP | 1 201 598 | 5/2002 |
| EP | 1 228 972 | 8/2002 |
| FR | 1.280.014 | 12/1961 |
| GB | 719054 | 11/1954 |
| GB | 2 457 041 | 8/2009 |

OTHER PUBLICATIONS

Written Opinion of the ISA for PCT/FR2020/052507 dated Apr. 14, 2021, 7 pages.

* cited by examiner

POURING DEVICE

CROSS-REFERENCE TO RELATED APPLICATIONS

This application is the U.S. national phase of International Application No. PCT/FR2020/052507 filed Dec. 17, 2020 which designated the U.S. and claims priority to French Patent Application No. 1915023 filed Dec. 19, 2019, the entire contents of each of which are hereby incorporated by reference.

BACKGROUND OF THE INVENTION

Field of the Invention

The invention relates to a pouring device having a particular application for piercing a container containing a granular material and emptying it, essentially by the phenomenon of gravity.

The invention is more specifically concerned with the emptying of vacuum-sealed packages in which the granular material is compacted on account of the vacuum inside the package and the difference in pressure between the internal pressure of the package, which is lower than atmospheric pressure, and the atmospheric pressure outside the package.

The invention further relates to a fermentation unit with a fermentation tank, comprising a pouring device according to the invention, configured to enable the aseptic transfer of granular material from the vacuum-sealed package to the fermentation tank.

The invention further relates to an equipment item comprising a pouring device according to the invention and a method for disinfecting the pouring device implementing such an equipment item.

The invention further relates to a vacuum-sealed package specifically configured to cooperate with said pouring device.

The pouring device according to the present disclosure has a particularly important application in the aseptic transfer of granular material contained in a vacuum-sealed package, and in particular in the aseptic transfer of a dry yeast contained in a vacuum-sealed package to an equipment item, particularly an industrial equipment item, such as a fermentation tank.

Description of the Related Art

The present disclosure relates to the field of vacuum-sealed packaging for dry granular material, such as dry yeast in powder form, and technical solutions offered for the aseptic transfer of the granular material contained in the packaging to a given equipment item.

In the field of beer production, it is very often necessary to add dry yeast in several of the production steps. For example, such an addition is done in order to implement fermentation in a tank, very often after cooling of a wort obtained by filtering a mixture of crushed cereal grains and water.

Active dry yeast is typically contained in a vacuum-sealed package in order to protect it from oxygen and moisture during storage. This package is opened for the purpose of being poured manually into the fermentation tank through a manhole. To the extent possible, this operation must be performed by aseptic means, otherwise germs, bacteria, or fungi may be transferred into the tank and could then develop during fermentation and degrade the organoleptic qualities of the beverage. In order to prevent germs from being transferred into the tank, the tools (such as a pair of scissors) used to open the package are disinfected, and the outside surfaces of the package may also be disinfected, before the vacuum-sealed package is pierced.

Once the vacuum-sealed package has been opened, the operator simply turns the package over above the manhole so that the yeast is poured onto the work in the fermentation tank.

According to the observations of the inventors, such a practice is not satisfactory, and this for several reasons:

- The disinfection of tools (such as pairs of scissors), typically done with a flame or with disinfecting solutions, is tedious and the success of the operation essentially depends on the operator's care in performing this operation,
- Manual pouring of the package over the manhole is often a tedious operation with a non-negligible risk of a harmful fall, for example a falling of the package into the tank, and above all,
- The opening of the manhole required for pouring in the yeast itself entails a risk of deteriorating the aseptic condition of the tank, because it allows a large quantity of non-sterilized air to enter the tank, with the potential risk of bacteria and fungi suspended in the air entering the tank, which could contaminate the wort.

Devices suitable for piercing and then emptying a package for the purpose of a hygienic product transfer are known from the prior art, such as for example as disclosed in the document EP 1201598. The device disclosed by EP 1201598 is intended to empty pouches of liquids, such as sauces or beverages, and implicitly requires the use of suction. This technical solution is neither effective nor functional for emptying a granular material from a vacuum-sealed package.

A device specially designed to empty a given quantity of a granular material (such as a fine powder, etc.) is also known, for example from the document GB 719054. This device comprises a piercing tool in the shape of an ogive used to pierce the wall of a container, until a shoulder provided at the base of the ogive comes into contact with the wall of the container. The piercing tool is hollow and has a lateral opening intended to be positioned entirely inside the container once the shoulder comes into contact with the wall. The lateral opening allows the material to be transferred into the body of the piercing tool, and then it flows to the base of the ogive toward an outlet hole. This device is designed to deliver a dose of material corresponding to the volume of the hollow portion each time the container is turned over.

In any event, and according to the inventors' observations, this device disclosed in GB 719054 is not capable of piercing and completely and quickly emptying the entirety of a package while it is kept in a static position, and especially in the case of a vacuum-sealed package.

SUMMARY OF THE INVENTION

The present disclosure improves this situation by proposing a pouring device having a particular application for piercing a vacuum-sealed package containing a granular material and emptying the package, essentially by the phenomenon of gravity.

More specifically, the device has a particular application in completely and quickly emptying the granular material of a vacuum-sealed package, with the package in a static position, i.e. without the need to turn the package over.

Another purpose of the present invention is to propose a production unit such as a fermentation unit provided with a pouring device configured for the aseptic transfer of the granular material contained in a vacuum-sealed package to an enclosure such as a fermentation tank of the production unit.

Another purpose of the present invention is to propose an equipment item comprising a pouring device according to the invention and a shutter which, in addition to its first function as a closing component, advantageously makes it possible to implement a cleaning and disinfection process on the inside and outside surfaces of the pouring device coming into contact with the granular material.

Another purpose of the present invention is to propose a cleaning and disinfection process implementing an equipment item according to the invention.

Yet another purpose of the invention is to propose a vacuum-sealed package specially configured to cooperate with the pouring device according to the invention, at least according to one embodiment.

Other purposes and advantages will become clear from the description which follows, given for information purposes and not intended to limit the scope of the invention.

According to a first aspect, a pouring device suitable for piercing and emptying a granular material contained in a vacuum-sealed package is proposed, the pouring device comprising:

- a tubular body, having a duct for the flow of the material, extending from an inlet opening at a first end of the tubular body to an outlet opening for the granular material at a second end of the tubular body,
- a hollow piercing tool having a distal end coming to a point and a widened base at the proximal end thereof, integral to the tubular body at the first end of the tubular body, the piercing tool having at least one lateral opening along the length of the piercing tool, said lateral opening extending over the length of the piercing tool from the widened base of the piercing tool, said lateral opening being configured to allow the material to be poured from the outside to the inside of the hollow portion of the piercing tool, the hollow portion of the widened base of the piercing tool being in communication with the inlet opening of the tubular body,
- a shoulder serving as a peripheral stop, said shoulder being formed by the first end of the tubular body arranged around the widened base of the piercing tool, said shoulder serving as a stop being configured to come into contact with the wall of the package to stop the pouring device when said wall is pierced by the piercing tool in a position in which said lateral opening extends to the inside of the package and in which said pouring device is configured to ensure the continuous emptying of the contents of the vacuum-sealed package when the pouring device is oriented vertically, the pointed tip pointing upward, the granular material flowing by gravity through said lateral opening via the inlet opening, and to the outlet opening by gravity in the opposite direction of the air entering the vacuum-sealed package.

According to one embodiment, said shoulder serving as a stop is configured to come into contact with the wall of the package to stop the pouring device when said wall is pierced by the piercing tool in a position wherein said lateral opening extends along a first portion of length inside the package and along a second portion of length outside the package where said lateral opening forms an air inlet, and wherein said shoulder is at a distance radially from the widened base of the piercing tool, the pouring device comprising a bowl formed on the first end of the tubular body, arranged along the periphery of the piercing tool, positioned intermediately between said shoulder and the widened base of the piercing tool, the slope of the bowl being angled toward the piercing tool and configured, when the piercing tool is oriented vertically, the pointed tip of the piercing tool pointing upward, so as to bring the granular material having escaped the hollow portion of the piercing tool into the inside of the hollow portion by gravity, through the second portion of length of the lateral opening.

According to of the optional features, taken individually or in combination:

- the widened base of the piercing tool having an external radius in relation to an axis of the piercing tool, the lower part of the bowl having a recess at said lateral opening at an additional depth of the wall of the bowl communicating with the duct of the tubular body, said recess being configured so that the inlet opening extends radially on the outside beyond radius R1 of the widened base of the piercing tool, at least to the location of said at least one lateral opening;
- the inlet opening extends to the location of the lateral opening up to a radius R2 with respect to the axis A of the piercing tool, which is greater than the outer radius R1 of the widened base of the piercing tool;
- the piercing tool has the shape of an ogive, comprising ogive arcs each of which extending from the widened base of the piercing tool to the pointed tip of the piercing tool wherein said ogive arcs meet, said at least one lateral opening comprising a plurality of lateral openings, each lateral opening extending from the widened base between two arcs of consecutive ogive arcs over all or a portion of the length of the piercing tool in the direction of the pointed tip.

According to one embodiment, the piercing tool comprises a locking groove intended to receive the wall edge of the package directly or indirectly via an annular ring rigidly connected to the wall of the package, said locking groove being configured to hold the piercing tool once the package has been pierced by the piercing tool, said locking groove being formed by a plurality of notches located on a same radius in relation to the axis A of the piercing tool.

According to one embodiment, said notches being positioned according to the axis A of the piercing tool level with said shoulder according to the direction of the axis A, at a distance from the widened base of the piercing tool along said direction of the axis A, and in such a way that said lateral opening extends upward when the wall of the package is locked by the notches of the locking groove both, on the one hand, inside the package on said first portion of length of the piercing tool located between the pointed tip and the locking groove, allowing the granular material inside the piercing tool to be poured, and, on the other hand, outside the package on the second portion of length of the piercing tool between the locking groove and the widened base where said lateral opening forms said air inlet.

According to one embodiment, the tubular body and piercing tool assembly is a portable hand tool, which can be worked manually, configured to manually pierce and empty the granular material from a vacuum-sealed package.

Alternatively, the pouring device may be an integral part of a production unit.

Also, the invention further relates to a production unit such as a fermentation unit comprising an enclosure such as a fermentation tank as well as a pouring device according to the invention, mounted so as to be fixed and integral to said enclosure, or a pipe of said production unit, the piercing tool oriented vertically, the pointed tip pointing upward, said pouring device being configured for transfer a granular material contained in a vacuum-sealed package in said enclosure directly into the tank or indirectly via said pipe.

According to one embodiment of the production unit, the tubular body of the pouring device is sealingly integral to said enclosure, particularly of the fermentation tank, so that the outlet opening communicates with the inside volume of said enclosure, said pouring device in the upper portion of said enclosure, configured so that the granular material flows from the outlet opening to the inside of the tank by gravity.

Alternatively, said enclosure, particularly the fermentation tank being forcibly fed with products by the pipe, said tubular body of the pouring device can be sealingly coupled to the pipe, either directly or indirectly via a transfer system so that the granular material flows into the pipe while being mixed with the products, and before said granular material is routed, together with the products, into said enclosure, such as the fermentation tank.

The invention further relates to an equipment item comprising a pouring device according to the invention or a pouring device of a fermentation unit according to the invention, as well as a shutter cooperating sealingly with the first end of the tubular body, covering the piercing tool and, if applicable, the bowl by forming a sealed chamber for a fluid, said chamber being defined between the shutter, on the one hand, and the piercing tool and the shoulder, and, if applicable, said bowl, on the other hand, said sealed chamber communicating with the duct of the tubular body via said at least one lateral opening.

The invention further relates to a method for cleaning and disinfecting the inside surfaces of the piercing tool and of the duct of the tubular body of the pouring device, and the outside surfaces of the piercing tool, and even of the bowl and even of the shoulder of the pouring device of an equipment item according to the invention, wherein:

- the shutter covering the piercing tool is put in place, said shoulder and, if applicable, the bowl forming a sealed chamber thereof for a fluid, said chamber being defined between the shutter, on the one hand, and the piercing tool, said shoulder, and, if applicable, the bowl, on the other hand, said sealed chamber communicating with the duct of the tubular body via said lateral opening,
- a disinfectant fluid is injected through the outlet opening so that the disinfectant fluid flows, on the one hand, into the duct and the hollow portion of the piercing tool and comes into contact with the inside walls of the duct and the hollow portion of the piercing tool, and flows, on the other hand, into the sealed chamber and comes into contact with the outside walls of the piercing tool and the shoulder and, if applicable, the bowl.

When the method is implemented in an equipment item comprising the pouring device of a fermentation unit according to the invention, the disinfectant fluid injection step disinfecting the inside surfaces of the piercing tool and the duct of the tubular body and the outer surfaces of the piercing tool, and, if applicable, the bowl, and the shoulder of the pouring device can be an injection that simultaneously cleans and/or sterilizes the inside surfaces of the fermentation unit. The cleaning and disinfecting method can thus be advantageously a "cleaning in place" (CIP) method.

The invention further relates to a vacuum-sealed package containing a granular material, as well as an annular ring integral to the wall of the package, configured to lock in the locking groove of a pouring device of the invention according to one embodiment.

According to one embodiment, the outside surface of the sealed wall of the vacuum-sealed package at the annular ring, intended to be pierced, may be sanitized and isolated from external contamination by a peelable sheet intended to be removed prior to piercing.

Lastly, the invention further relates to the use of the pouring device according to the invention or belonging to the production unit, particularly a fermentation unit according to the invention, or to the equipment item according to the invention for emptying a vacuum-sealed package containing active dry yeast.

The features disclosed in the paragraphs below may optionally be implemented. They may be implemented independently of each other or in combination with each other.

BRIEF DESCRIPTION OF THE DRAWINGS

Other features, details and advantages will become clear from the following detailed description and the analysis of the appended drawings, wherein.

DESCRIPTION OF THE PREFERRED EMBODIMENTS

Figure 1:
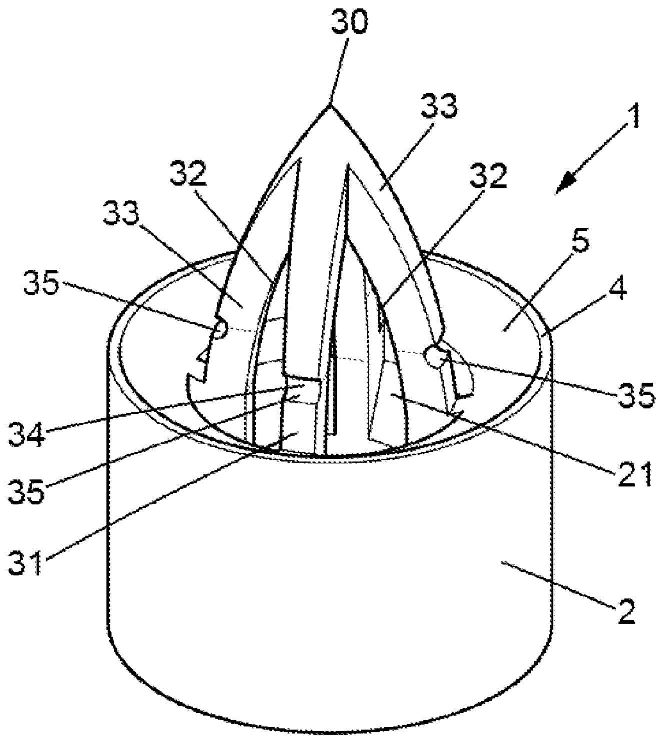
FIG. 1 is a perspective view of a pouring device according to one embodiment.

The invention relates to a pouring device 1 suitable for piercing and emptying a granular material contained in a vacuum-sealed package.

The granular material is preferably dry, such as an active dry yeast intended for the implementation of fermentation, such as for beer production. The granular material is contained in a vacuum-sealed package. The material and the package are compacted due to the vacuum and the difference in pressure between the inside pressure, which is less than atmospheric pressure, and the outside pressure, that is, atmospheric pressure.

According to the preliminary tests conducted by the inventors, pouring devices operating by the piercing of a package to empty liquids or a granular material from a conventional package (without a vacuum), such as those known from the prior art disclosed, for example, in GB 719054, are not satisfactory for emptying a compacted granular material from a vacuum-sealed package. When these devices are used with such a vacuum-sealed package, the granular material starts to empty before the flow runs dry. These pouring devices do not make it possible to quickly empty the granular contents of the package. In other words, the air needed to empty the granular contents, flowing in the opposite direction of the flow, may cause a reflux resulting in a loss of granular material, which escapes the device at the piercing location.

The present disclosure, at least according to one embodiment, arose from the inventors' observation that the pouring devices of the prior art, when used to pierce and empty a vacuum-sealed package, cause a partial vacuum during the flow of the material which may have a tendency to maintain a vacuum inside the empty package opposing the flow of the granular material. Furthermore, when the air needed for emptying only flows in the opposite direction of the granular material, that air can cause refluxes resulting in loss of product.

At least according to one embodiment of the present disclosure, the inventors have responded to this problem by designing a pouring device providing for the pouring of the granular material by simple gravity, by promoting the entry of air through a pierced opening in the package while the pouring device is held in a substantially static position, and without any risk of losing product, even in the event of reflux.

Advantageously, such a device thus makes it possible to quickly and continuously empty all of the granular material contained in the vacuum-sealed package.

Also, as shown in the figures as non-limiting examples, the pouring device for piercing and emptying a granular material contained in a vacuum-sealed package P comprises:

- a tubular body 2, having a duct 20 for the flow of the material, extending from an inlet opening 21 positioned at a first end of the tubular body to an outlet opening 22 for the granular material, positioned at a second end of the tubular body 2,
- a hollow piercing tool 3 having a distal end ending in a pointed tip 30 and a widened base 31 at the proximal end thereof, rigidly connected to the tubular body at the first end of the tubular body, the piercing tool having at least one lateral opening 32 along the length of the piercing tool, said lateral opening 32 extending along the length of the piercing tool from the widened base 31 of the piercing tool, said lateral opening being configured to allow the material to be poured from the outside to the inside of the hollow portion of the piercing tool 3, the hollow portion of the widened base 31 of the piercing tool 3 being in communication with the inlet opening 21 of the tubular body 2,
- a shoulder 4 serving as a peripheral stop, formed by the first end of the tubular body 2 arranged around the widened base 31 of the piercing tool, said shoulder 4 serving as a stop being configured to come into contact with the wall of the package to stop the pouring device when said wall is pierced by the piercing tool in a position in which said lateral opening 32 extends to the inside of the package.

Generally, it is noted that the axis A of the piercing tool and the axis of the duct 20 are preferably substantially the same, the duct 20 extending the piercing tool vertically when the piercing tool is oriented vertically, the pointed tip 30 pointing upward.

Generally, it is noted that the piercing tool can comprise a plurality of lateral openings 32 distributed around the axis A of the piercing tool and, for example, with four each opening extends over an angular sector, particularly less than 90°.

Figure 4:
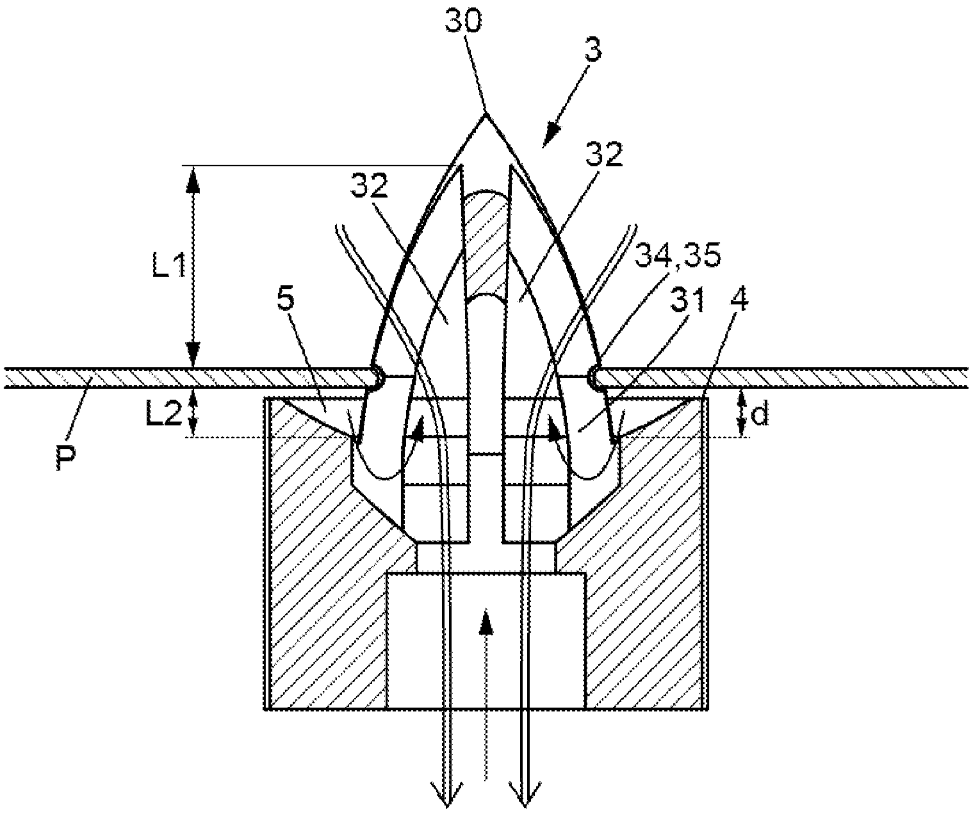
FIG. 4 is a cross-sectional view of the device in use when the piercing tool passes through the wall of the vacuum-sealed package, the edge of the wall of the package received directly and locked in a locking groove of the piercing tool.
Figure 5:
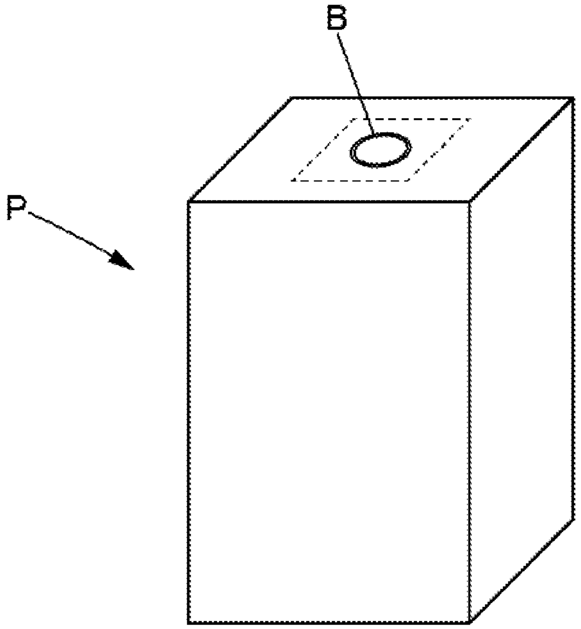
FIG. 5 is a view of a vacuum-sealed package notably comprising an annular ring integral to the wall of the package, intended to cooperate with the aforementioned locking groove as well as a peelable protective sheet intended to isolate the outside surface of the package locally at the annular ring from outside contamination.
Figure 5A:
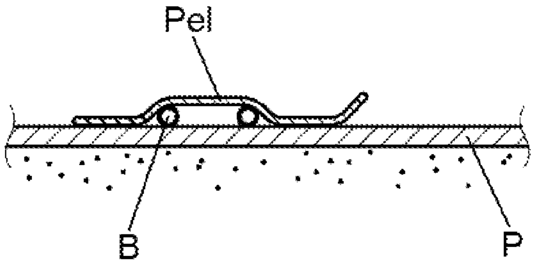
FIG. 5*a* is a detail cross-sectional view showing the wall of the package, the peelable sheet, and the intermediate annular ring.

Thus, as shown in FIG. 4, such a pouring device is used by piercing the wall of the package by means of the piercing tool until the shoulder 4 stops against the outer surface of the package. Pouring occurs when the device is held in a position wherein the axis of the piercing tool is substantially vertical and the pointed tip 30 is pointing upward; the granular material flows from the package, through said lateral opening in the hollow portion of the piercing tool 3, through the inlet opening 21, and to the outlet opening 22 where the granular material escapes.

In order to take into account the vacuum in the package which may have a tendency to prevent a rapid emptying of the granular contents, the pouring device 1 may comprise the following features, at least according to one embodiment.

Said shoulder 4 serving as a stop is configured to come into contact with the wall of the package to stop the pouring device when said wall is pierced by the piercing tool 3, and notably in a position wherein said lateral opening 32 extends along a first portion of length L1 inside the package and along a second portion of length L2 outside the package where said lateral opening forms an air inlet.

Thus, one can notice in FIG. 4 that each lateral opening penetrates the package by the first portion of length L1 of the lateral opening 32, where said lateral opening allows granular material to enter the hollow portion of the piercing tool, and extends along the second portion of length L2 outside the package where said lateral opening forms an air inlet.

As shown in FIG. 4 and as represented by the single-line arrows, the second portion of length L2 of the lateral opening provides a lateral air inflow at the first end of the tubular body 2 in the opposite direction of the granular material flowing by gravity, shown by a double arrow. This lateral air inflow is advantageously in addition to the possible air inflow taking place axially from the outlet opening 22 through the duct 20 of the tubular body.

As an example, the ratio L2/L1 can be between 0.05 and 0.25, such as 0.1.

The lateral air inlet or inlets formed by said lateral opening 32 substantially increase the quantity of air entering the vacuum-sealed package, while avoiding the creation of a vacuum caused by the flow of the granular material, which promotes the flow of the material from the vacuum-sealed package: the flow is substantially better and allows the granular contents of the vacuum-sealed package to be emptied quickly, even when the pouring device is kept still, the tip pointing upward.

It must be noted, however, that from time to time the air flowing axially in the opposite direction of the granular material may cause refluxes of granular material that escape laterally through said (or each) lateral opening 32 on the second section of length L2 outside the package. The inventors have remedied this problem by allowing granular material to return to the device by gravity.

Thus, according to this embodiment of the present disclosure, said shoulder is radially distant from the widened base 31 of the piercing tool, the device comprises a bowl 5, formed on the first end of the tubular body 2, arranged on the periphery around the piercing tool 3, particularly 360° around the piercing tool 3. This bowl 5 is positioned intermediately between said shoulder 4 and the widened base 31 of the piercing tool: The slope of the bowl is advantageously angled toward the piercing tool 3 and configured (when the piercing tool is oriented vertically, the tip 30 of the piercing tool pointing upward) so as to bring the granular material having escaped the hollow portion of the piercing tool into the inside of the hollow portion by gravity, through the second portion of length L2 of the lateral opening 32. The bowl 5 thus advantageously serves the function of returning the granular material that escapes laterally through said lateral opening 32, to duct 20.

Ultimately, said pouring device is configured to continuously empty the contents of the vacuum-sealed package when the pouring device is oriented vertically, the tip pointing upward, the granular material flowing by gravity through said lateral opening 32 via the inlet opening 21 and up to the outlet opening 22 by gravity, in the opposite direction of the air entering the package, particularly through the axial air inlet formed by the duct 20 and possibly, if applicable, through the lateral air inlet or inlets through said lateral opening 32.

As a non-limiting example:

- the height H of the piercing tool along the axis A, from the shoulder 4 to the pointed tip 30, can be between 25 mm and 40 mm, for example on the order of 30 mm to 40 mm,
- the diameter D of the widened base of the piercing tool can be between 15 mm and 25 mm, such as for example 20 mm,
- the diameter Dc of the bowl 5 is between 120% and 200% of the diameter of the widened base 31 of the piercing tool, for example between 40 mm and 60 mm.

Figure 2:
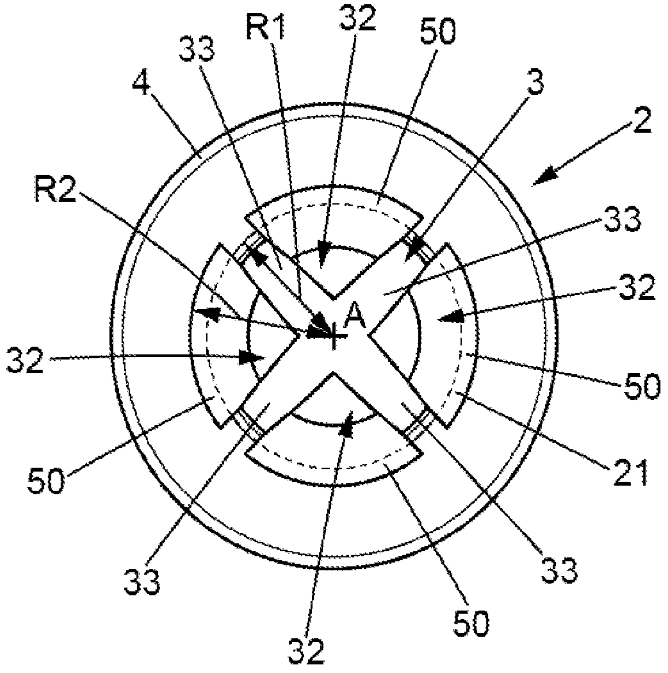
FIG. 2 is a top view of the device as illustrated in FIG. 1.
Figure 3:
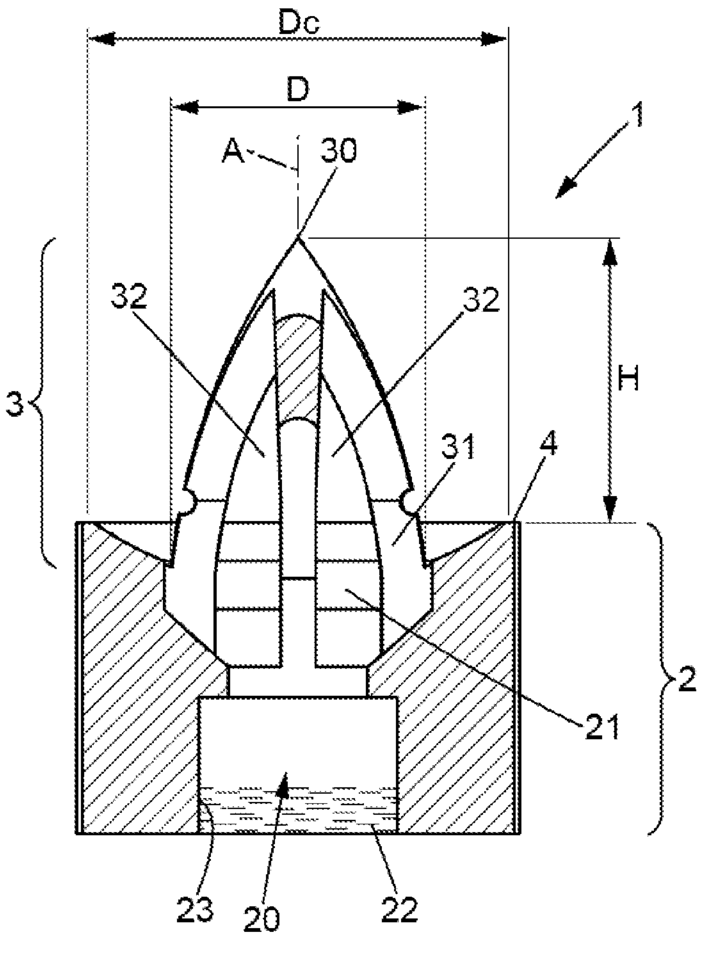
FIG. 3 is a cross-sectional view of the device in FIG. 1 along a vertical plane parallel to the longitudinal axis of the device and slightly offset from the longitudinal axis.

According to one embodiment shown as an example in FIG. 2, the widened base of the piercing tool having an outer radius R1 in relation to an axis A of the piercing tool, the lower part of the bowl 5 having a recess 50 at said lateral opening 32, at an additional depth of the wall of the bowl 5 communicating with the duct 20 of the tubular body 2.

This recess 50 is, in particular, configured so that the inlet opening 21 extends radially on the outside beyond the radius R1 of the widened base 31 of the piercing tool, at least to the location of said at least one lateral opening 32.

Such a recess 50, particularly visible in FIG. 2, further promotes the return of the granular material from the bowl 5 to the inlet opening 21, avoiding the accumulation of material in the bowl 5, outside of the piercing tool 3. Such a recess 50 can be provided at each lateral opening 32. The inlet opening 21 can thus extend to the location of the lateral opening 32 up to a radius R2 in relation to the axis A of the piercing tool, which is greater than the outer radius R1 of the widened base 31 of the piercing tool 3, as shown in FIG. 2.

The piercing tool 3 can have the shape of an ogive comprising ogive arches 33, each of which extending from the widened base 31 of the piercing tool 3 to the pointed tip 30 of the piercing tool where the ogive arches 33 meet. Said at least one lateral opening 32 can comprise a plurality of lateral openings 32. Each lateral opening 32 preferably extends from the widened base 31 between two consecutive ogive arches 33 over the entire length or a portion of the length of the piercing tool toward the pointed tip 30. As an example, there are four of the ogive arches 33 distributed around the axis A, for example every 90°.

According to one embodiment, the piercing tool 3 comprises a locking groove 34 intended to receive the wall edge of the package P directly, or indirectly via an annular ring B rigidly connected to the wall of the package P. The locking groove 34 is configured so as to hold the piercing tool on the package once the package has been pierced by the piercing tool 3.

For example, when the pouring device is configured as a removable and independent hand tool, the locking groove 34 holds the pouring device 1 on the wall of the package, suspended from the package, and without the need for the operator to hold the pouring device 1.

As shown in the figures, the locking groove 34 is formed by a plurality of notches 35, for example on the ogive arches 33 located on a same radius in relation to the axis A of the piercing tool. The notches 35 are positioned according to the axis A of the piercing tool level with said shoulder 4 according to the direction of the axis A, at a distance from the widened base 31 of the piercing tool according to said direction of the axis A, in such a way that said lateral opening 32 extends upward, when the wall of the package is locked by the notches 35 of the locking groove 34, both inside the package on said first portion of length L1 of the piercing tool 3 located between the pointed tip 30 and the locking groove 34, on the one hand, and outside the package on the second portion of length L2 of the piercing tool 3 which extends between the locking groove 34 and the widened base 31, on the other hand. On this second portion of length L2 said lateral opening forms said lateral air inlet.

Figure 6:
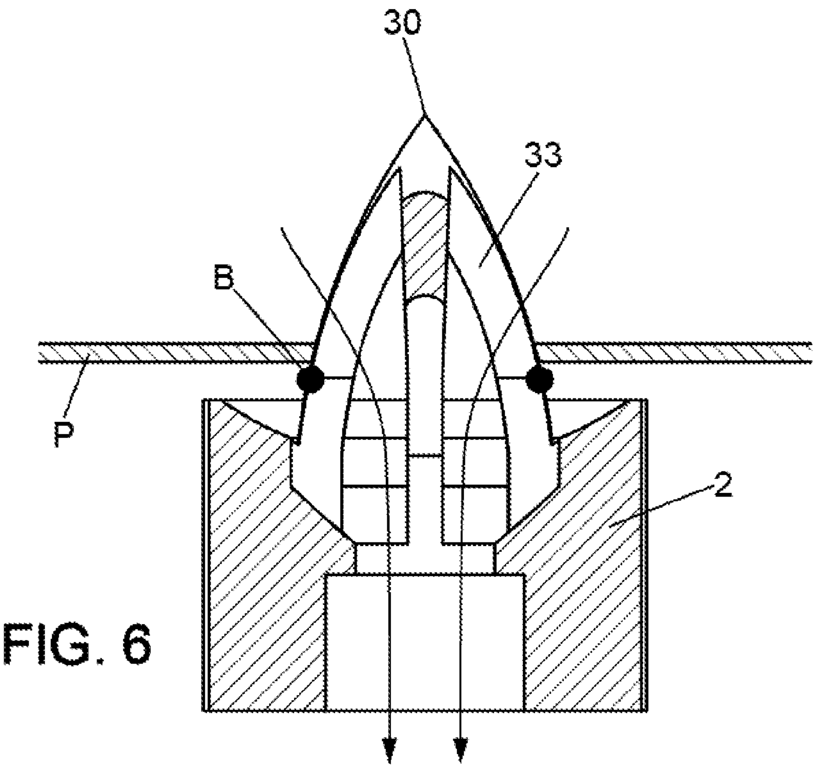
FIG. 6 is a cross-sectional view of the device in use when the piercing tool passes through the wall of the vacuum-sealed package, the annular ring received and held in the locking groove of the piercing tool.

The locking groove makes it possible to engage directly with the wall edge of the package as shown in FIG. 4, or indirectly via an annular ring B rigidly connected to the wall of the package, as shown in FIG. 6.

Also, the invention further relates to a package P containing a granular material, as well as an annular ring B rigidly connected to the wall of the package, configured to lock in the locking groove 34 of a pouring device 1.

According to another possibility which may (or may not) be combined with the presence of the annular ring B, the outside surface of the sealed wall of the vacuum-sealed package intended to be pierced, if applicable, at the annular ring B, is isolated from external contamination by a peelable sheet Pel intended to be removed before piercing. This surface can preferably be sanitized or sterilized right before the peelable sheet Pel is installed.

Figure 9:
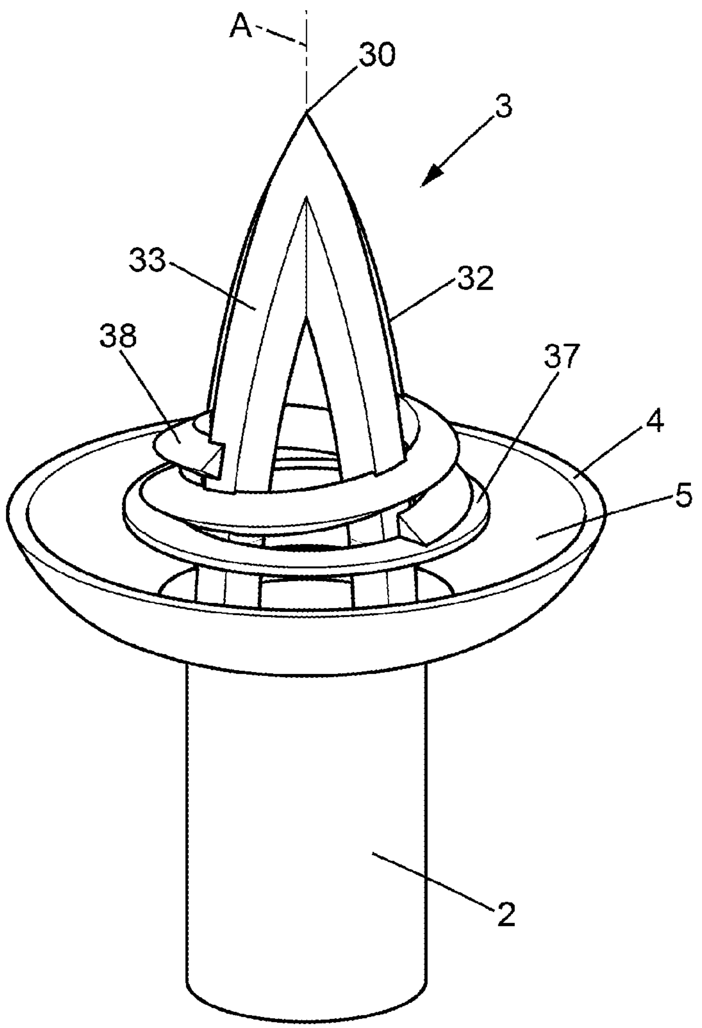
FIG. 9 is a perspective view of a pouring device according to a second embodiment as an alternative to FIG. 1, the locking groove holding the edge of the wall of the package being eliminated and replaced with a stop protruding radially from the piercing tool, coupled to a screw thread.

The variant of FIG. 9 notably comprises a stop 37 protruding radially from the piercing tool (as a replacement for the locking groove 34 in FIG. 1), more particularly in the form of a ring substantially perpendicular to the axis A of the piercing tool. This ring connects the ogive arches 33 of the piercing tool to each other. This stop 37 is positioned substantially at the same level as said shoulder 4, according to the axis A, at a distance from the widened base 31 according to this direction A. This stop is preceded by a screw thread 38 that connects the ogive arches 33 of the piercing tool to each other.

Installation of the pouring device is done by piercing the flexible wall of the package with the pointed tip 31 of the piercing tool 3, then by threading the screw thread 38 with the flexible wall of the package until the flexible wall is clamped between the ring forming a stop 37 and an immediately adjacent portion of the screw thread 38 when the wall of the package rests on said shoulder 4.

According to a first possibility, the assembly of the tubular body 2 and the piercing tool 3 is configured as a portable hand tool, which can be worked manually, configured to manually pierce and empty the granular material from a vacuum-sealed package.

According to another possibility, the pouring device can be an integral part of a production unit, permanently mounted on the production unit, the pointed tip of the piercing tool pointing upward.

Also, the invention further relates to a production unit 7 such as a fermentation unit comprising an enclosure 70 such as a fermentation tank, as well as a pouring device 1 according to the invention, rigidly mounted on said enclosure 70 or rigidly connected to a pipe 71 of said production unit, the piercing tool oriented vertically, the pointed tip pointing upward, said pouring device being configured to transfer a granular material contained in a vacuum-sealed package to said enclosure 70, directly into said enclosure or indirectly via said pipe 71.

To that end, the second end of the tubular body is sealingly secured to said enclosure 70, particularly to the fermentation tank or to the pipe, for example by means of an internal thread 23 at the outlet opening 22 engaging by screwing with a threaded coupling of the production unit. Any other type of coupling can be used to attach the second end to the tank or to the pipe, such as a coupling according to the SMS standard or a coupling known to a person skilled in the art by the name of "CLAMP coupling."

According to one embodiment, the tubular body of the pouring device is rigidly and sealingly connected to said enclosure 70 so that the outlet opening 22 communicates with the inside volume of the fermentation tank. The pouring device is secured to the upper portion of the tank, configured so that the granular material flows from the outlet opening 22 to the inside of said enclosure 70, particularly the tank, by gravity.

According to another possibility, said enclosure 70, particularly the fermentation tank 70, being force-fed with product by the pipe 71, said tubular body of the pouring device is sealingly coupled to the pipe 71 directly or indirectly via a transfer system so that the granular material flows into the pipe 71 while mixing with the products, and before said granular material is routed, together with the products, into said enclosure 70.

For example, one can use a transfer system such as a venturi 8, through which the fluid in the pipe passes, the partial vacuum generated by the venturi 8 sucking the granular material so as to mix it with the fluid downstream of the venturi.

The present disclosure further relates to an equipment item comprising a pouring device 1 according to the invention, or a pouring device of a fermentation unit 7 according to the invention, as well as a cover 6 sealingly engaging with the first end of the tubular body, covering (in the closed position) the piercing tool and the bowl while forming a sealed chamber 60 for a fluid.

This chamber is defined between the inside wall of the cover 6, on the one hand, and the piercing tool 3 (the bowl 5, if applicable) and the shoulder 4, on the other hand, said sealed chamber communicating with the duct 20 of the tubular body via said at least one lateral opening. Such a cover 6, in addition to the function thereof as a component for closing the inlet opening, can advantageously make it possible to implement a cleaning and disinfecting method. The cover 6 can be screwed onto the tubular body, the cover having an inside thread engaging with an outside thread of the tubular body at the first end of the tubular body. Alternatively, the cover 6 can be attached to the tubular body of the device by any type of coupling, such as an SMS coupling or a CLAMP coupling.

Also, the invention further relates to a method for cleaning and disinfecting the inside surfaces of the piercing tool and of the duct of the tubular body of the pouring device 1 and of the outside surfaces of the piercing tool, of the shoulder, and, if applicable, of the bowl of the pouring device of an equipment item according to the invention.

This cleaning and disinfecting method comprises the following steps:

- the cover 6 covering the piercing tool is put in place, said shoulder 4 (and, if applicable, the bowl 5) forming a sealed chamber 60 thereof for a fluid, said chamber being defined between the cover, on the one hand, and the piercing tool 3, said shoulder 4 (and, if applicable, the bowl 5), on the other hand, said sealed chamber communicating with the duct 20 of the tubular body via said at least one lateral opening 32,
- a disinfectant fluid is injected through the outlet opening 22 so that the disinfectant fluid flows, on the one hand, into the duct 20 and the hollow portion of the piercing tool while coming into contact with the inside walls of the duct 20 and of the hollow portion of the piercing tool 3, and flows, on the other hand, into the sealed chamber 60 while coming into contact with the outside walls of the piercing tool 3 and of the shoulder 4 and, if applicable, the bowl 5.

Figure 7:
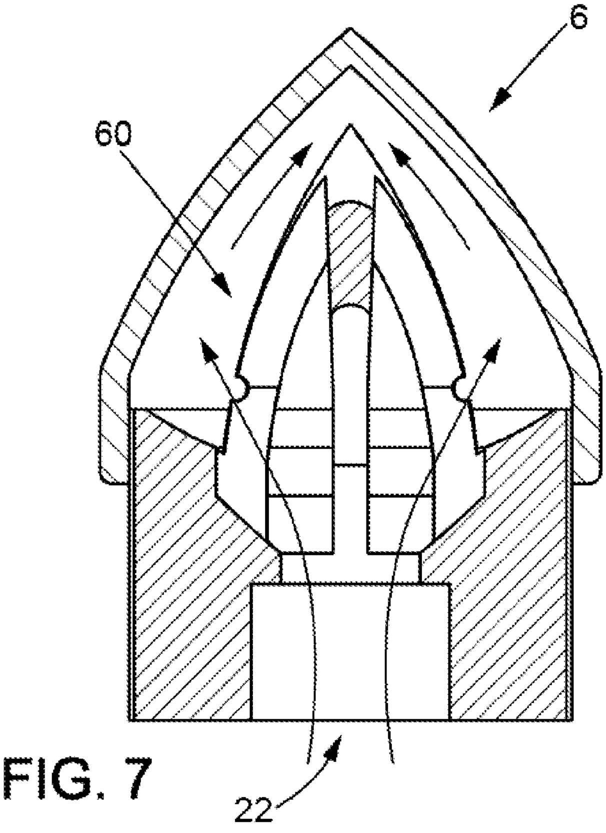
FIG. 7 is a cross-sectional view of an equipment item comprising a device according to FIG. 1 and a shutter, allowing for the implementation of a cleaning and disinfecting method on the inside and outside surfaces of the pouring device.
Figure 7A:
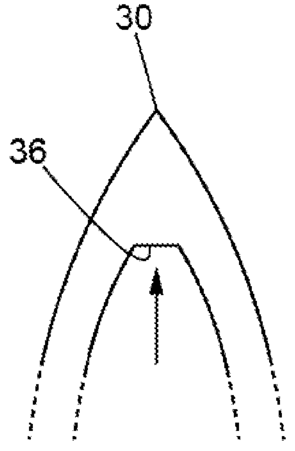
FIG. 7*a* is a partial cross-sectional view of the piercing tool, passing through the longitudinal axis, showing more specifically the under surface of the hollow portion of the tool at the pointed tip, with the presence of a flat part preventing product from being withheld.
Figure 8:
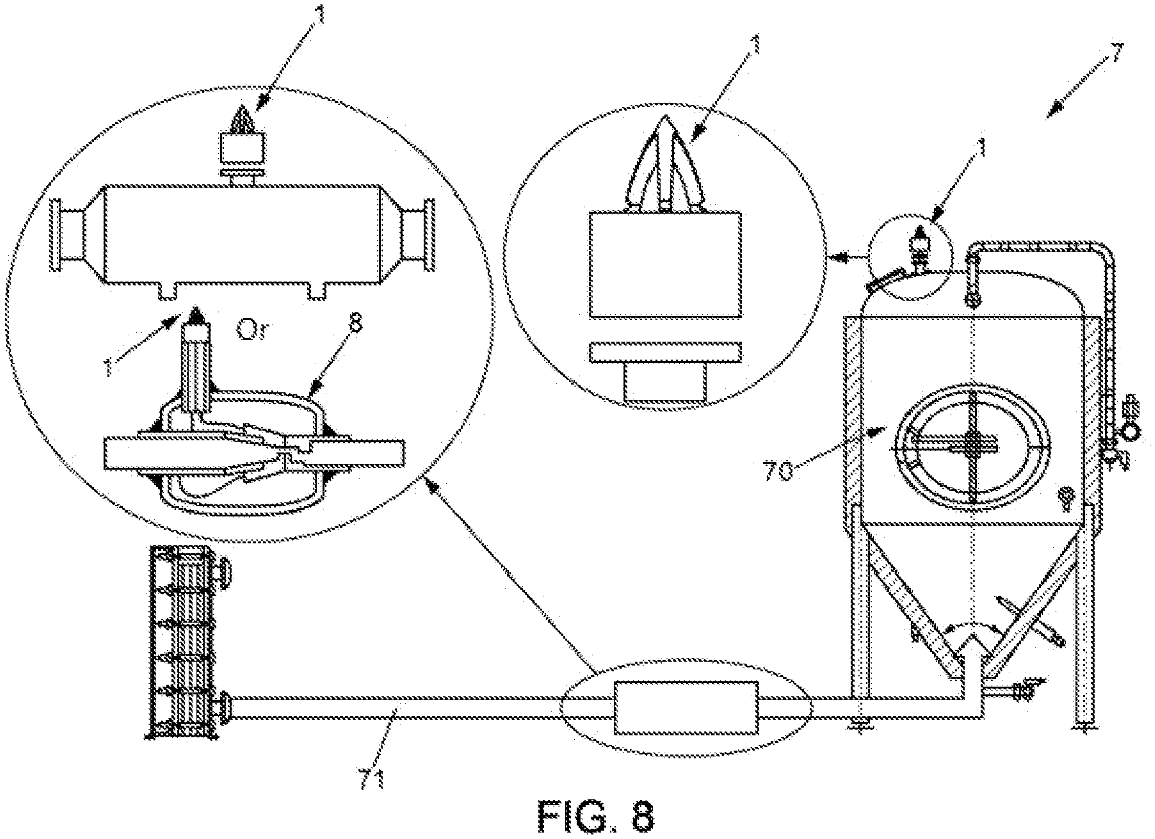
FIG. 8 is a schematic view showing a plurality of possible integrations of a pouring device according to FIG. 1 permanently installed in a fermentation unit.

As shown in the detail figure of FIG. 7*a*, the hollow portion of the piercing tool can have a flat part 36 on the under surface of the piercing tool, opposite the pointed tip 30, avoiding product retention.

When the pouring device is configured as an integral part of a production unit, this cleaning and disinfecting step can advantageously take place simultaneously with the cleaning and/or disinfecting of the production unit 7. For example, for the fermentation unit, the step for disinfectant fluid injection for disinfecting the inside surfaces of the piercing tool and of the duct of the tubular body of the pouring device 1, and the outside surfaces of the piercing tool, of the bowl, and of the should, is an injection that simultaneously cleans the inside surfaces of the fermentation unit. In other words, the disinfection of the pouring device is performed simultaneously by means of the step for cleaning the fermentation unit.

INDUSTRIAL APPLICABILITY

The pouring device has a particular application for emptying a vacuum-sealed package containing active dry yeast, for example in beer production.

LIST OF REFERENCE SIGNS

1: Pouring device,
2. Tubular body,
20. Duct
21. Inlet opening,
22. Outlet opening,
23. Inside threads
3. Piercing tool,
30. Pointed tip,
31. Widened base,
32. Lateral opening,
33. Ogive arches,
34. Locking groove
35. Notch

36. Flat part, inside the hollow portion of the piercing tool (underside opposite the pointed tip)

4. Shoulder serving as a stop,

5. Bowl,

50. Recess at an additional depth of the angled wall of the bowl,

6. Cover;

60. Sealed chamber,

7. Production unit, such as a fermentation unit,

70. Enclosure, such as a fermentation tank,

71. Pipe,

8. Venturi

A. Axis of the piercing tool

B. Annular ring

D. Widened base diameter,

Dc. Bowl diameter,

H. Height of the piercing tool from the shoulder,

P. Vacuum-sealed package,

Pel. Peelable sheet

L1. First portion of length of said lateral opening (intended to be inside the package), L2. Second portion of length of said lateral opening (intended to be inside the package), R1. Outer radius of the widened base, R2. Radius of the inlet opening with recess present

The invention claimed is:

1. Pouring device suitable for piercing and emptying a granular material contained in a vacuum-sealed package, comprising:

a tubular body, having a duct for the flow of the material, extending from an inlet opening positioned at a first end of the tubular body to an outlet opening for the granular material, positioned at a second end of the tubular body, a hollow piercing tool having a distal end ending in a pointed tip and a widened base at the proximal end thereof, rigidly connected to the tubular body at the first end of the tubular body, the piercing tool having at least one lateral opening along the length of the piercing tool, said lateral opening extending along the length of the piercing tool from the widened base of the piercing tool, said lateral opening being configured to allow the material to be poured from the outside to the inside of the hollow portion of the piercing tool, the hollow portion of the widened base of the piercing tool communicating with the inlet opening of the tubular body, and a shoulder serving as a peripheral stop, formed by the first end of the tubular body arranged around the widened base of the piercing tool, said shoulder serving as a stop being configured to come into contact with the wall of the package to stop the pouring device when said wall is pierced by the piercing tool in a position in which said lateral opening extends to the inside of the package, wherein said pouring device is configured to ensure the continuous emptying of the contents of the vacuum-sealed package when the pouring device is oriented vertically, the pointed tip pointing upward, the granular material flowing by gravity through said lateral opening via the inlet opening and to the outlet opening by gravity in the opposite direction of an air entering the vacuum-sealed package, and wherein the piercing tool comprises a locking groove intended to receive the wall edge of the package directly, or indirectly via an annular ring rigidly connected to the wall of the package, said locking groove being configured so as to hold the piercing tool once the package has been pierced by the piercing tool, said groove being formed by a plurality of notches located on a same radius with respect to the axis A of the piercing tool.

2. The pouring device according to claim 1, wherein said shoulder serving as a stop is configured to come into contact with the wall of the package to stop the pouring device when said wall is pierced by the piercing tool in a position wherein said lateral opening extends along a first portion of length inside the package and along a second portion of length outside the package where said lateral opening forms an air inlet, and wherein said shoulder is at a distance radially from the widened base of the piercing tool, the pouring device comprising a bowl formed on the first end of the tubular body, arranged along the periphery about the piercing tool, positioned intermediately between said shoulder and the widened base of the piercing tool, the slope of the bowl being angled toward the piercing tool and configured, when the piercing tool is oriented vertically, the pointed tip of the piercing tool pointing upward, so as to bring the granular material having escaped the hollow portion of the piercing tool into the inside of the hollow portion by gravity, through the second portion of length of the lateral opening.

3. The pouring device according to claim 2, wherein the widened base of the piercing tool having an outer radius R1 in relation to an axis of the piercing tool, the lower part of the bowl having a recess at said lateral opening, at an additional depth of the wall of the bowl communicating with the duct of the tubular body, said recess being configured so that the inlet opening extends radially on the outside beyond the outer radius R1 of the widened base of the piercing tool, at least to the location of said at least one lateral opening.

4. The pouring device according to claim 3, wherein the inlet opening extends to the location of the lateral opening up to a radius R2 with respect to the axis A of the piercing tool, which is greater than the outer radius R1 of the widened base of the piercing tool.

5. The pouring device according to claim 1, wherein the piercing tool has the shape of an ogive comprising ogive arches, each of which extending from the widened base of the piercing tool to the pointed tip of the piercing tool where said ogive arches meet, said at least one lateral opening comprising a plurality of lateral openings, each lateral opening extending from the widened base between two consecutive ogives arches over all or part of the length of the piercing tool in the direction of the pointed tip.

6. The pouring device according to claim 1, wherein said notches are positioned according to the axis A of the piercing tool level with said shoulder according to the direction of the axis A, at a distance from the widened base of the piercing tool according to said direction of the axis A, and in such a way that said lateral opening extends upward when the wall of the package is locked by the notches of the locking groove, both inside the package on said first portion of length of the piercing tool located between the pointed tip and the locking groove, on the one hand, allowing the granular material to be poured into the piercing tool, and outside the package on the second portion of length of the piercing tool between the locking groove and the widened base, where said lateral opening forms said air inlet, on the other hand.

7. The pouring device according to claim 1, wherein the assembly of the tubular body and the piercing tool is a portable hand tool, suitable for being worked manually, configured to manually pierce and empty the granular material from a vacuum-sealed package.

8. Vacuum-sealed package containing a granular material, as well as an annular ring rigidly connected to the wall of the package, configured to lock in the locking groove of a pouring device according to claim 1.

9. The package according to claim 8, wherein the outside surface of the sealed wall of the vacuum-sealed package at the annular ring, intended to be pierced, is sanitized and isolated from external contamination by a peelable sheet intended to be removed before piercing.

10. Production unit comprising an enclosure which is a fermentation tank as well as a pouring device suitable for piercing and emptying a granular material contained in a vacuum-sealed package, comprising:

a tubular body, having a duct for the flow of the material, extending from an inlet opening positioned at a first end of the tubular body to an outlet opening for the granular material, positioned at a second end of the tubular body, a hollow piercing tool having a distal end ending in a pointed tip and a widened base at the proximal end thereof, rigidly connected to the tubular body at the first end of the tubular body, the piercing tool having at least one lateral opening along the length of the piercing tool, said lateral opening extending along the length of the piercing tool from the widened base of the piercing tool, said lateral opening being configured to allow the material to be poured from the outside to the inside of the hollow portion of the piercing tool, the hollow portion of the widened base of the piercing tool communicating with the inlet opening of the tubular body, and a shoulder serving as a peripheral stop, formed by the first end of the tubular body arranged around the widened base of the piercing tool, said shoulder serving as a stop being configured to come into contact with the wall of the package to stop the pouring device when said wall is pierced by the piercing tool in a position in which said lateral opening extends to the inside of the package, wherein said pouring device is configured to ensure the continuous emptying of the contents of the vacuum-sealed package when the pouring device is oriented vertically, the pointed tip pointing upward, the granular material flowing by gravity through said lateral opening via the inlet opening and to the outlet opening by gravity in the opposite direction of an air entering the vacuum-sealed package, the pouring device being rigidly mounted on the enclosure or a pipe of said production unit, the piercing tool oriented vertically, the pointed tip pointing upward, said pouring device being configured to transfer a granular material contained in a vacuum-sealed package to the enclosure, directly into said enclosure or indirectly via said pipe.

11. The production unit according to claim 10, wherein the tubular body of the pouring device is sealingly and rigidly connected to said enclosure so that the outlet opening communicates with the inside volume of said enclosure, said pouring device in the upper portion of said enclosure configured so that the granular material flows from the outlet opening to the inside of said enclosure by gravity.

12. The production unit according to claim 10, wherein said enclosure being force-fed with product by the pipe, said tubular body of the pouring device is sealingly coupled to the pipe directly or indirectly via a transfer system so that the granular material flows into the pipe while mixing with the products, and before said granular material is routed, together with the products, into said enclosure.

* * * * *